(12) United States Patent
Iizawa

(10) Patent No.: US 11,789,700 B2
(45) Date of Patent: Oct. 17, 2023

(54) INFORMATION PROCESSING DEVICE, INFORMATION PROCESSING SYSTEM, AND NON-TRANSITORY COMPUTER-READABLE STORAGE MEDIUM FOR STORING PROGRAM

(71) Applicant: FUJITSU LIMITED, Kawasaki (JP)

(72) Inventor: Ken Iizawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 380 days.

(21) Appl. No.: 17/123,168

(22) Filed: Dec. 16, 2020

(65) Prior Publication Data

US 2021/0232365 A1 Jul. 29, 2021

(30) Foreign Application Priority Data

Jan. 27, 2020 (JP) ................. 2020-011201

(51) Int. Cl.
*G06F 7/24* (2006.01)
*G11B 5/008* (2006.01)
*G06F 7/76* (2006.01)

(52) U.S. Cl.
CPC ............... *G06F 7/24* (2013.01); *G06F 7/768* (2013.01); *G11B 5/00813* (2013.01)

(58) Field of Classification Search
CPC ........ G06F 7/24; G06F 7/768; G11B 5/00813
USPC ......................................... 711/4, 1
See application file for complete search history.

(56) References Cited

U.S. PATENT DOCUMENTS

| 5,623,608 A | 4/1997 | Ng | |
|---|---|---|---|
| 2013/0166554 A1* | 6/2013 | Yoon | G06F 40/177 707/737 |
| 2013/0246701 A1* | 9/2013 | Fujihara | G06F 3/061 711/111 |
| 2015/0116858 A1 | 4/2015 | Itagaki et al. | |

FOREIGN PATENT DOCUMENTS

| JP | H08-212054 A | 8/1996 |
|---|---|---|
| JP | 2002-156479 A | 5/2002 |
| JP | 2013-191259 A | 9/2013 |
| JP | 2015-088199 A | 5/2015 |

* cited by examiner

*Primary Examiner* — David Yi
*Assistant Examiner* — Zubair Ahmed
(74) *Attorney, Agent, or Firm* — Fujitsu Patent Center

(57) ABSTRACT

An information processing device includes: a memory; and a processor coupled to the memory, the processor being configured to: sort stream data buffered in units of wraps of a sequential recording medium, in a column order and a time order of the stream data, as primary data to be written into a primary wrap of the sequential recording medium; and control writing of the sorted primary data into the primary wrap, wherein the sorting of the stream data is configured to sort secondary data to be written into a secondary wrap that follows the primary wrap, in a reverse order of the column order and in the time order, and wherein the controlling of the primary data is configured to control writing of the sorted secondary data into the secondary wrap.

3 Claims, 17 Drawing Sheets

FIG. 1

| Time | C1 | C2 | ... | C(j-1) | Cj |
|------|----|----|-----|--------|-----|
| $t_1$ | $V_{11}$ | $V_{12}$ | ... | $V_{1(j-1)}$ | $V_{1j}$ |
| $t_2$ | $V_{21}$ | $V_{22}$ | ... | $V_{2(j-1)}$ | $V_{2j}$ |
| $t_3$ | $V_{31}$ | $V_{32}$ | ... | $V_{3(j-1)}$ | $V_{3j}$ |
| ⋮ | ⋮ | ⋮ | ⋮ | ⋮ | ⋮ |
| $t_{i-1}$ | $V_{(i-1)1}$ | $V_{(i-1)2}$ | ... | $V_{(i-1)(j-1)}$ | $V_{(i-1)j}$ |
| $t_i$ | $V_{i1}$ | $V_{i2}$ | ... | $V_{i(i-1)}$ | $V_{ij}$ |

FIG. 9

| START TIME | END TIME | COLUMN | BEGINNING ADDRESS | SIZE |
|---|---|---|---|---|
| $t_1$ | $t_2$ | Time | a1 | s1 |
| | | C1 | a2 | s2 |
| | | C2 | a3 | s3 |
| | | C3 | a4 | s4 |
| $t_2$ | $t_3$ | Time | a5 | s5 |
| | | C1 | a6 | s6 |
| | | C2 | a7 | s7 |
| | | C3 | a8 | s8 |

FIG. 11

| time | c1 | c2 | c3 |
|------|-----|-----|-----|
| $t_1$ | $v_{11}$ | $v_{12}$ | $v_{13}$ |
| $t_2$ | $v_{21}$ | $v_{22}$ | $v_{23}$ |
| $t_3$ | $v_{31}$ | $v_{32}$ | $v_{33}$ |
| $t_4$ | $v_{41}$ | $v_{42}$ | $v_{43}$ |
| $t_5$ | $v_{51}$ | $v_{52}$ | $v_{53}$ |
| $t_6$ | $v_{61}$ | $v_{62}$ | $v_{63}$ |
| $t_7$ | $v_{71}$ | $v_{72}$ | $v_{73}$ |
| $t_8$ | $v_{81}$ | $v_{82}$ | $v_{83}$ |
| ⋮ | ⋮ | ⋮ | ⋮ |

| | | | | | | | |
|---|---|---|---|---|---|---|---|
| $v_{43}$ | $v_{53}$ | $t_{12\_3}$ | $t_{13\_3}$ | $t_{20\_3}$ | $t_{21\_3}$ | $t_{28\_3}$ | $t_{29\_3}$ |
| $v_{33}$ | $v_{63}$ | $t_{11\_3}$ | $t_{14\_3}$ | $t_{19\_3}$ | $t_{22\_3}$ | $t_{27\_3}$ | $t_{30\_3}$ |
| $v_{23}$ | $v_{73}$ | $t_{10\_3}$ | $t_{15\_3}$ | $t_{18\_3}$ | $t_{23\_3}$ | $t_{26\_3}$ | $t_{31\_3}$ |
| $v_{13}$ | $v_{83}$ | $t_{9\_3}$ | $t_{16\_3}$ | $t_{17\_3}$ | $t_{24\_3}$ | $t_{25\_3}$ | $t_{32\_3}$ |
| $v_{42}$ | $v_{52}$ | $t_{12\_2}$ | $t_{13\_2}$ | $t_{20\_2}$ | $t_{21\_2}$ | $t_{28\_2}$ | $t_{29\_2}$ |
| $v_{32}$ | $v_{62}$ | $t_{11\_2}$ | $t_{14\_2}$ | $t_{19\_2}$ | $t_{22\_2}$ | $t_{27\_2}$ | $t_{30\_2}$ |
| $v_{22}$ | $v_{72}$ | $t_{10\_2}$ | $t_{15\_2}$ | $t_{18\_2}$ | $t_{23\_2}$ | $t_{26\_2}$ | $t_{31\_2}$ |
| $v_{12}$ | $v_{82}$ | $t_{9\_2}$ | $t_{16\_2}$ | $t_{17\_2}$ | $t_{24\_2}$ | $t_{25\_2}$ | $t_{32\_2}$ |
| $v_{41}$ | $v_{51}$ | $t_{12\_1}$ | $t_{13\_1}$ | $t_{20\_1}$ | $t_{21\_1}$ | $t_{28\_1}$ | $t_{29\_1}$ |
| $v_{31}$ | $v_{61}$ | $t_{11\_1}$ | $t_{14\_1}$ | $t_{19\_1}$ | $t_{22\_1}$ | $t_{27\_1}$ | $t_{30\_1}$ |
| $v_{21}$ | $v_{71}$ | $t_{10\_1}$ | $t_{15\_1}$ | $t_{18\_1}$ | $t_{23\_1}$ | $t_{26\_1}$ | $t_{31\_1}$ |
| $v_{11}$ | $v_{81}$ | $t_{9\_1}$ | $t_{16\_1}$ | $t_{17\_1}$ | $t_{24\_1}$ | $t_{25\_1}$ | $t_{32\_1}$ |
| $t_4$ | $t_5$ | $t_{12}$ | $t_{13}$ | $t_{20}$ | $t_{21}$ | $t_{28}$ | $t_{29}$ |
| $t_3$ | $t_6$ | $t_{11}$ | $t_{14}$ | $t_{19}$ | $t_{22}$ | $t_{27}$ | $t_{30}$ |
| $t_2$ | $t_7$ | $t_{10}$ | $t_{15}$ | $t_{18}$ | $t_{23}$ | $t_{26}$ | $t_{31}$ |
| $t_1$ | $t_8$ | $t_9$ | $t_{16}$ | $t_{17}$ | $t_{24}$ | $t_{25}$ | $t_{32}$ |

INFORMATION PROCESSING DEVICE, INFORMATION PROCESSING SYSTEM, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2020-11201, filed on Jan. 27, 2020, the entire contents of which are incorporated herein by reference.

FIELD

The embodiment discussed herein is related to an information processing device, an information processing system, and a non-transitory computer-readable storage medium storing a program.

BACKGROUND

Stream data, which is infinitely chronologically arriving data, is sometimes recorded in a tape cartridge (may be referred to as "tape medium") by a tape drive.

FIG. 1 is a table exemplifying entries in stream data.

The minimum unit of stream data may be referred to as an entry.

A time stamp (Time in FIG. 1) and a plurality of fields (C1, C2, . . . , C(j−1), Cj in FIG. 1) are associated with the entries. In FIG. 1, for example, multiple fields V11, V12, . . . , V1(j−1), V1j are associated with the time stamp t1.

Examples of the data as illustrated in FIG. 1 include sensor data transmitted from an instrument provided with a plurality of sensors. The multiple fields one-to-one correspond to the values of the respective sensors.

The stream data accumulated on the tape medium is read out and subjected to a statistical process, machine learning, and the like as an analysis job.

Usually, only some fields of stream data are used for an analysis job. For example, a read-out request to extract only fields C1 and C2 from stream data at times t1 to t2 illustrated in FIG. 1 is expressed as the following structured query language (SQL) statement.

SELECT C1, C2 WHERE Time>=t1 AND Time<t2

Examples of the related art include Japanese Laid-open Patent Publication No. 2013-191259, and Japanese Laid-open Patent Publication No. 2015-88199.

SUMMARY

According to an aspect of the embodiments, an information processing device includes: a memory; and a processor coupled to the memory, the processor being configured to: sort stream data buffered in units of wraps of a sequential recording medium, in a column order and a time order of the stream data, as primary data to be written into a primary wrap of the sequential recording medium; and control writing of the sorted primary data into the primary wrap, wherein the sorting of the stream data is configured to sort secondary data to be written into a secondary wrap that follows the primary wrap, in a reverse order of the column order and in the time order, and wherein the controlling of the primary data is configured to control writing of the sorted secondary data into the secondary wrap.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a table exemplifying entries in stream data;

FIG. 9 is a diagram exemplifying data position information in the information processing system illustrated in FIG. 4;

FIG. 11 is a table exemplifying stream data processed in the information processing system illustrated in FIG. 4;

FIG. 13 is a table exemplifying a writing process for a second wrap in the information processing system illustrated in FIG. 4;

FIG. 14 is a table exemplifying a writing process for all wraps in the information processing system illustrated in FIG. 4;

FIG. 15 is a table exemplifying a writing process for some columns in the information processing system illustrated in FIG. 4;

DESCRIPTION OF EMBODIMENT(S)

Figure 2:
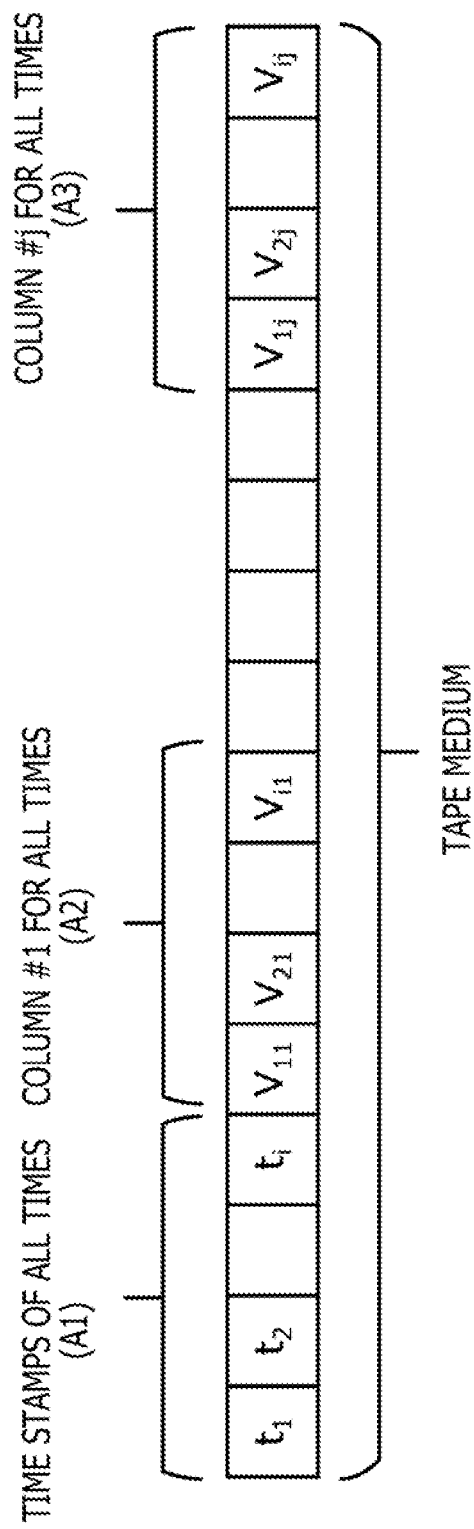
FIG. 2 is a diagram illustrating a first example of a recording order of entries on a tape medium in a related example.

FIG. 2 is a diagram illustrating a first example of the recording order of entries on a tape medium in a related example.

In the tape medium illustrated in FIG. 2, the stream data entries are recorded in the order of the time stamps of all times (refer to reference sign A1), a column #1 for all the times (refer to reference sign A2), and a column #j for all the times (refer to reference sign A3). The time stamps of all the times include t, t2, . . . , and ti, the column #1 for all the times includes V11, V21, ..., and Vi1, and the column #j for all the times includes V1j, V2j, ..., and V1j.

The tape medium is a medium having high sequential access performance but low random access performance. For this reason, in a case where it is premised that only a small number of columns is read out, placing the same column in continuous areas on the tape medium as illustrated in FIG. 2 will enable high-speed reading-out of each column.

However, stream data received at an archive node is not immediately written onto the tape medium but is provisionally buffered in a high-speed storage. Then, after the data for one tape medium is buffered in the high-speed storage, the data is sorted in the column order and in the time order within each column, and is written onto the tape medium. Therefore, a total of two buffers are prepared for temporary recording before and after sorting. Furthermore, since a large amount of random inputs and outputs (I/O) are issued in this sort process, a large-capacity high-speed storage is sometimes desired as a buffer for temporary recording.

Figure 3:
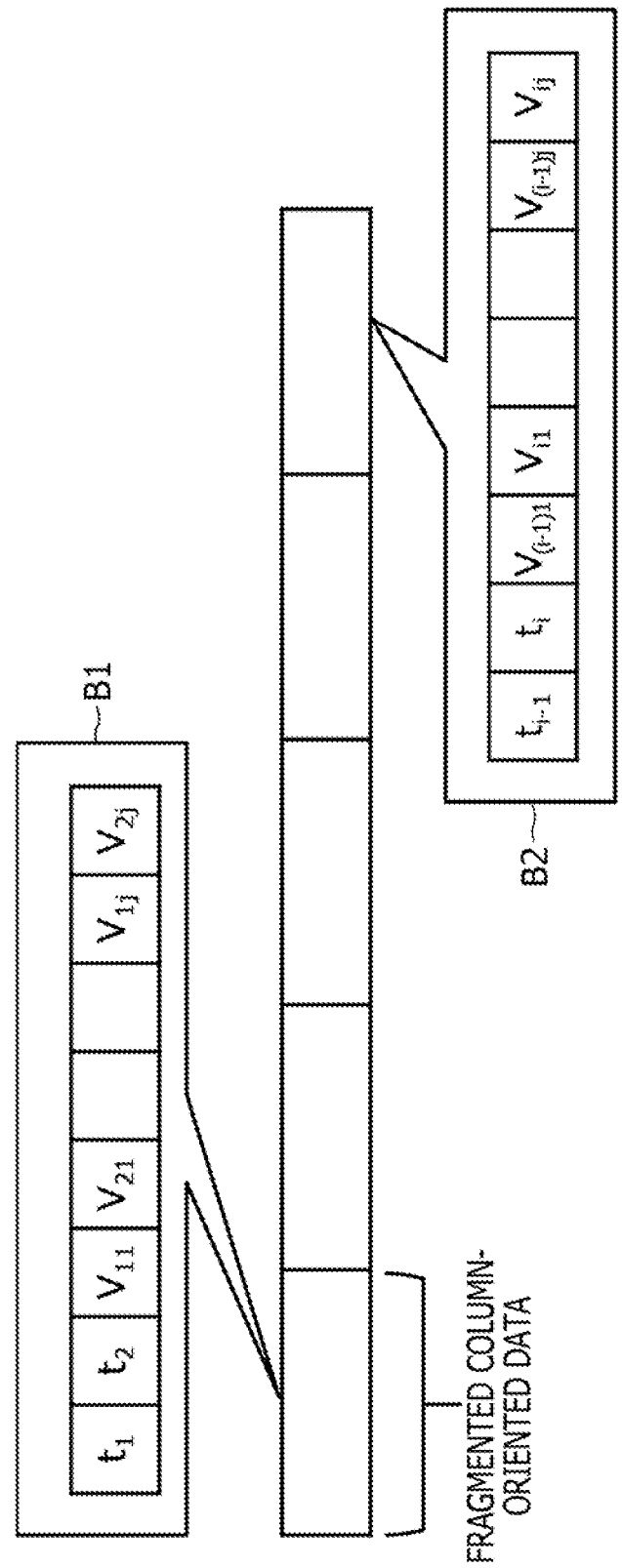
FIG. 3 is a diagram illustrating a second example of the recording order of entries on a tape medium in a related example.

FIG. 3 is a diagram illustrating a second example of the recording order of entries on a tape medium in a related example.

On the other hand, a management can also be assumed in which a small-capacity high-speed storage is prepared, and the data is sorted and written to the tape medium every time the capacity of the high-speed storage becomes full. In such a management, an area written partially in a column-oriented format (which may be rephrased as "fragmented column-oriented data") as illustrated in FIG. 3 repeatedly appears on a single tape medium. For the sake of simplicity, FIG. 3 illustrates a data layout in a case where the high-speed storage is capable of buffering only two records (which may be rephrased as "all columns for two times").

Entries t1, t2, v11, v21, ..., V1j, and V2j are recorded in fragmented column-oriented data indicated by reference sign B1. Furthermore, entries ti−1, ti, V(i−1)1, Vi1, ..., V(i−1)j, and Vij are recorded in fragmented column-oriented data indicated by reference sign B2.

However, in order to read the data for all the times stored in the tape medium for a certain column, the certain column in certain fragmented column-oriented data is first read, and then seeking for the certain column in subsequent fragmented column-oriented data is performed. Since the seeking in the tape medium is performed by winding the tape medium similarly to reading-out, the seek speed is almost the same as the read-out speed. Therefore, when the head movement between pieces of the fragmented column-oriented data is performed for seeking, it takes the time equal to the time for reading out the entire tape medium, and thus speeding up the reading-out process by writing the data partially in the column-oriented format may not be expected.

In one aspect, it is an object of the present embodiment to shorten the read-out time of data having a time series when only some columns on a sequential recording medium is read out.

Hereinafter, an embodiment will be described with reference to the drawings. However, the embodiment to be described below is merely an example, and there is no intention to exclude application of various modifications and techniques not explicitly described in the embodiment. This means that the present embodiment may be modified in various ways to be implemented without departing from the spirit thereof.

Furthermore, each drawing is not intended to include only the constituent elements illustrated in the drawing, and may include other functions and the like.

Hereinafter, each of the same reference signs denotes a similar part in the drawings, and thus description thereof will be omitted.

[A] Exemplary Embodiment

[A-1] Exemplary System Configuration

Figure 4:
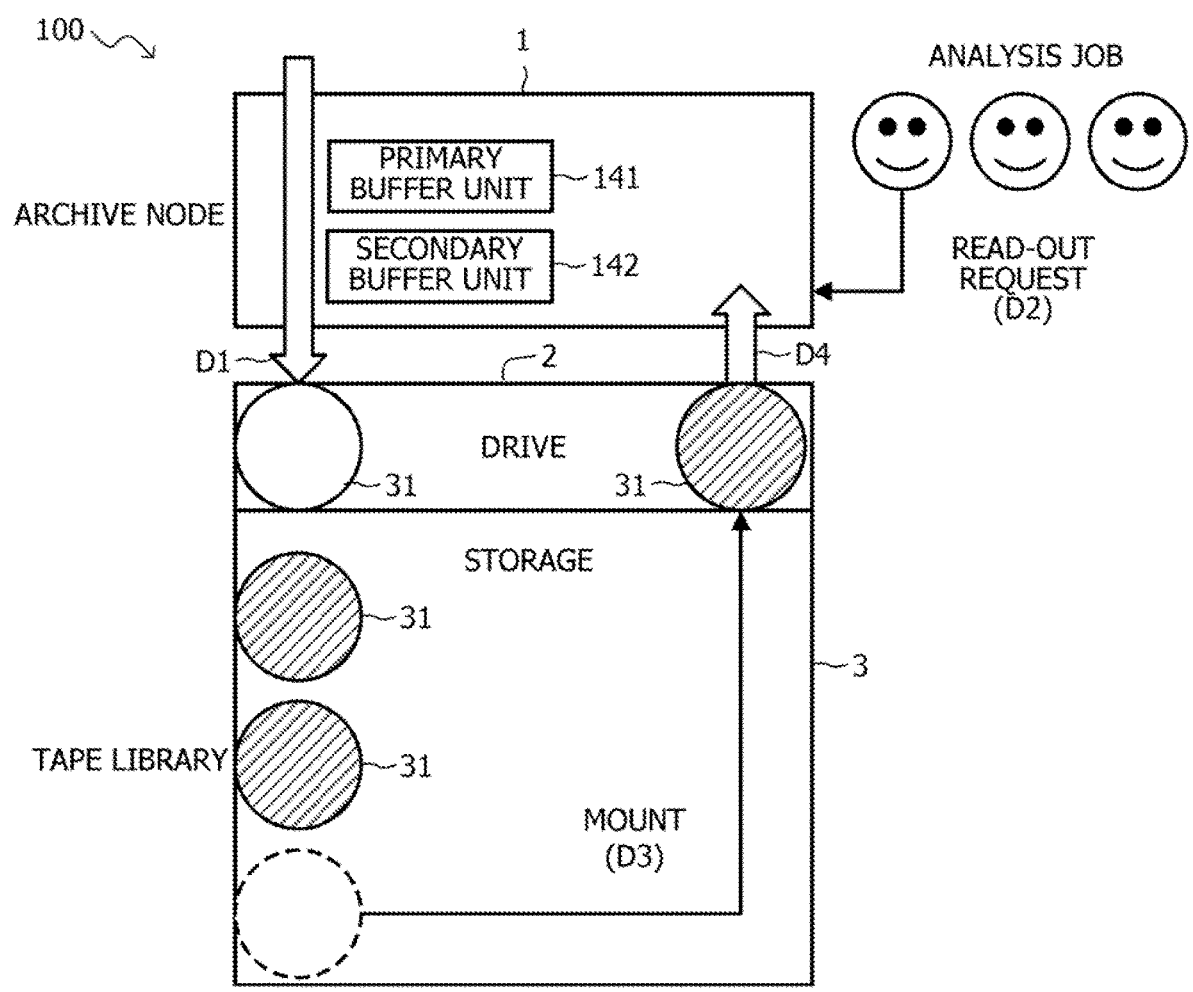
FIG. 4 is a block diagram schematically illustrating an exemplary configuration of an information processing system according to an exemplary embodiment.

FIG. 4 is a block diagram schematically illustrating an exemplary configuration of an information processing system 100 according to an exemplary embodiment.

The information processing system 100 includes an archive node 1 and a storage device, and the storage device is provided with a drive 2, and a tape library 3 including a robot that stores and loads/unloads a plurality of tape media 31.

The drive 2 is an example of a recording device, and is a tape drive for accumulating stream data from the archive node 1 in the tape medium 31. Furthermore, the drive 2 is a tape drive for reading out stream data requested by the archive node 1 from the tape medium 31. The tape medium 31 is a magnetic sequential recording medium. The drive 2 is an example of a sequential medium storage device.

The tape library 3 stores the plurality of tape media 31 in which stream data is recorded by the drive 2.

The archive node 1 is a computer (which may be rephrased as an information processing device) having a server function. The archive node 1 includes a primary buffer unit 141 and a secondary buffer unit 142. Details of the function of the archive node 1 will be described later with reference to, for example, FIGS. 5 and 6.

The archive node 1 temporarily records stream data received from a network (not illustrated) in the primary buffer unit 141. The archive node 1 rearranges the stream data temporarily recorded in the primary buffer unit 141 in the order of recording the stream data on the tape medium 31, and temporarily records the rearranged stream data in the secondary buffer unit 142.

The archive node 1 writes the rearranged data recorded in the secondary buffer unit 142 onto the tape medium 31 in the drive 2 (refer to reference sign D1). When the storage area of the tape medium 31 becomes full, the tape medium 31 is unloaded from the drive 2, and is stored in the tape library 3. Then, a new tape medium 31 is loaded into the drive 2.

Upon reception of a stream data read-out request based on an analysis job (refer to reference sign D2), the archive node 1 mounts a tape medium 31 storing the requested entry (which may be rephrased as a field) into the drive 2 (refer to reference sign D3). Furthermore, the archive node 1 sends back the read-out data to the analysis job (refer to reference sign D4).

Figure 5:
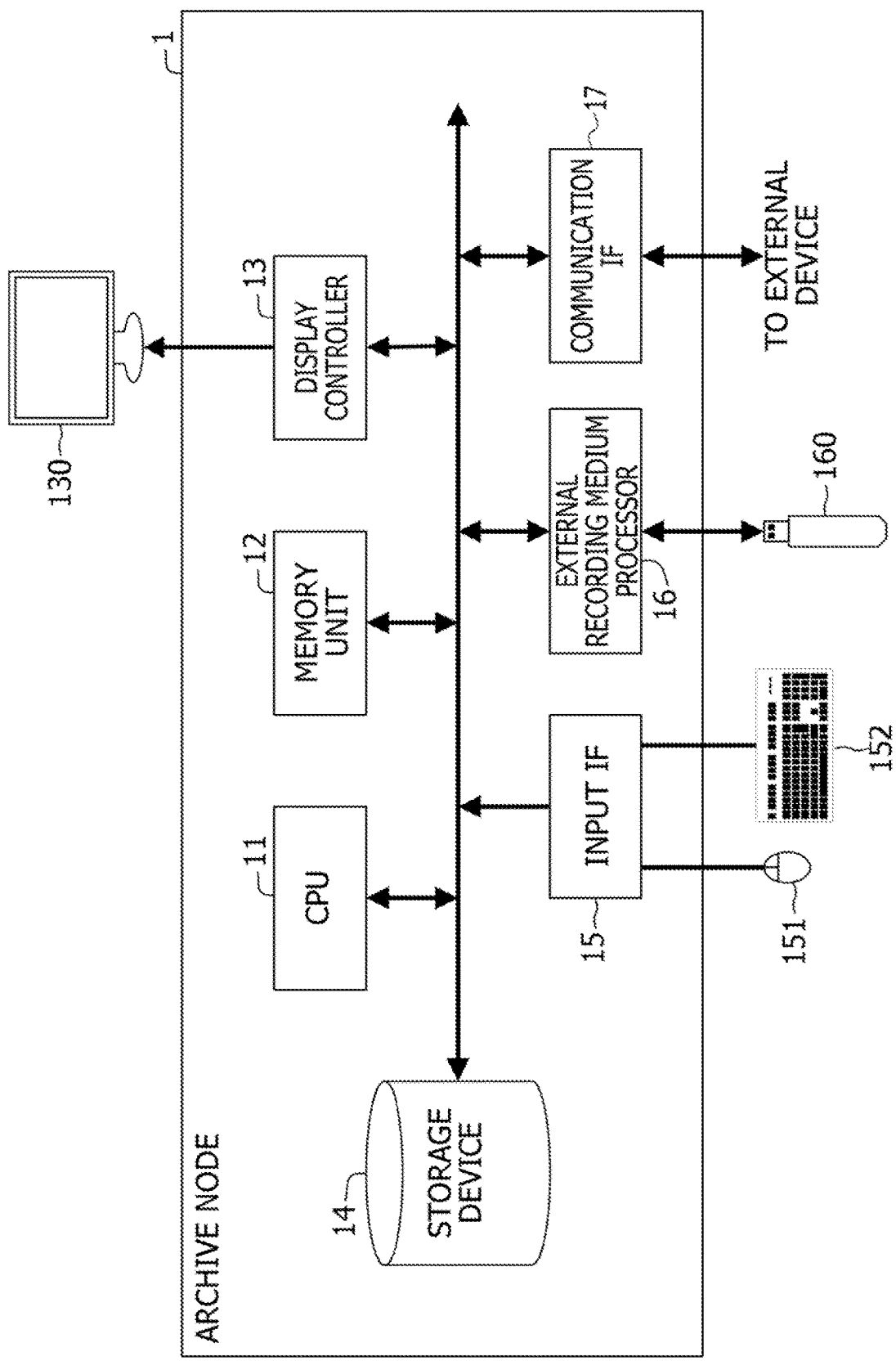
FIG. 5 is a block diagram schematically illustrating an exemplary hardware configuration in an archive node illustrated in FIG. 4.

FIG. 5 is a block diagram schematically illustrating an exemplary hardware configuration in the archive node 1 illustrated in FIG. 4.

As illustrated in FIG. 5, the archive node 1 includes a central processing unit (CPU) 11, a memory unit 12, a display controller 13, a storage device 14, an input interface (IF) 15, an external recording medium processor 16, and a communication IF 17.

The memory unit 12 is an example of a storage unit, which is, for example, a read only memory (ROM), a random access memory (RAM), and the like. Programs such as a basic input/output system (BIOS) may be written into the ROM of the memory unit 12. A software program of the memory unit 12 may be appropriately read and executed by the CPU 11. Furthermore, the RAM of the memory unit 12 may be used as a temporary recording memory or a working memory.

The display controller 13 is connected to a display device 130, and controls the display device 130. The display device 130 is a liquid crystal display, an organic light-emitting diode (OLED) display, a cathode ray tube (CRT), an electronic paper display, or the like, and displays various kinds of information for an operator or the like. The display device 130 may be combined with an input device, and may be, for example, a touch panel.

The storage device 14 is a storage device having high input/output (IO) performance, and for example, a dynamic random access memory (DRAM), a solid state drive (SSD), a storage class memory (SCM), and a hard disk drive (HDD) may be used. A part of the storage device 14 functions as the primary buffer unit 141 and the secondary buffer unit 142 illustrated in FIG. 4.

The input IF 15 may be connected to an input device such as a mouse 151 and a keyboard 152, and may control the input device such as the mouse 151 and the keyboard 152. The mouse 151 and the keyboard 152 are exemplary input devices, and the operator performs various input operations through those input devices.

The external recording medium processor 16 is configured in such a manner that a recording medium 160 can be attached thereto. The external recording medium processor 16 is configured to be capable of reading information recorded in the recording medium 160 when the recording medium 160 is attached thereto. In the present example, the recording medium 160 is portable. For example, the recording medium 160 is a flexible disk, an optical disk, a magnetic disk, a magneto optical disk, a semiconductor memory, or the like.

The communication IF 17 is an interface for enabling communication with an external device.

The CPU 11 is a processor that performs various kinds of control and calculation, and achieves various functions by executing an operating system (OS) and programs stored in the memory unit 12.

The device for controlling the action of the entire archive node 1 is not limited to the CPU 11, and may be any one of an MPU, DSP, ASIC, PLD, and FPGA, for example. Furthermore, the device for controlling the action of the entire archive node 1 may be a combination of two or more of the CPU, MPU, DSP, ASIC, PLD, and FPGA. Note that the MPU is an abbreviation for a micro processing unit, the DSP is an abbreviation for a digital signal processor, and the ASIC is an abbreviation for an application specific integrated circuit. Furthermore, the PLD is an abbreviation for a programmable logic device, and the FPGA is an abbreviation for a field programmable gate array.

Figure 6:
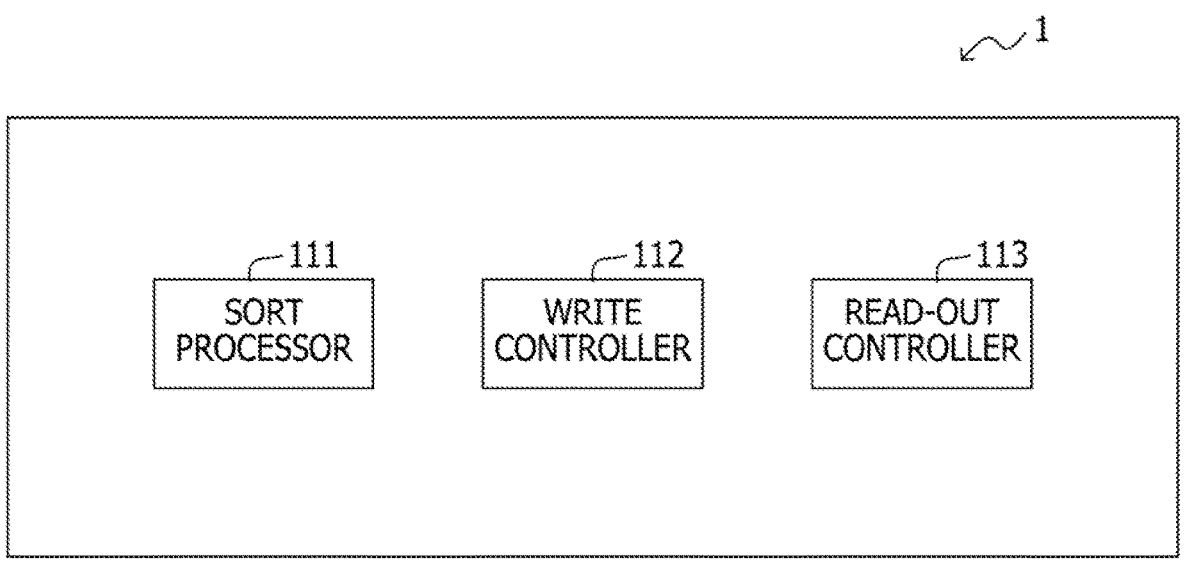
FIG. 6 is a block diagram schematically illustrating an exemplary software configuration in the archive node illustrated in FIG. 4.

FIG. 6 is a block diagram schematically illustrating an exemplary software configuration in the archive node 1 illustrated in FIG. 4.

As illustrated in FIG. 6, the archive node 1 functions as a sort processor 111, a write controller 112, and a read-out controller 113.

The sort processor 111 sorts entries included in stream data recorded in the primary buffer unit 141 in a predetermined order, and records the sorted entries in the secondary buffer unit 142.

For example, the sort processor 111 sorts stream data buffered in units of wraps of the tape medium 31, in a column order and a time order of the stream data, as primary data to be written onto the tape medium 31 in a primary wrap. Furthermore, the sort processor 111 sorts secondary data to be written into a secondary wrap that follows the primary wrap, in a reverse order of the column order and in the time order.

The write controller 112 causes the drive 2 to write the data recorded in the secondary buffer unit 142 onto the tape medium 31 in accordance with the order of the entries sorted by the sort processor 111.

For example, the write controller 112 controls writing of the primary data sorted by the sort processor 111 into the primary wrap. Furthermore, the write controller 112 controls writing of the secondary data sorted by the sort processor 111 into the secondary wrap.

The write controller 112 may control writing of the primary data and the secondary data such that an entry to be written last into the primary wrap and an entry to be written initially into the secondary wrap belong to the same column in the stream data and its times are continuous.

The read-out controller 113 causes the drive 2 to read out the data recorded in the tape medium 31 in accordance with a read-out request.

Figure 7:
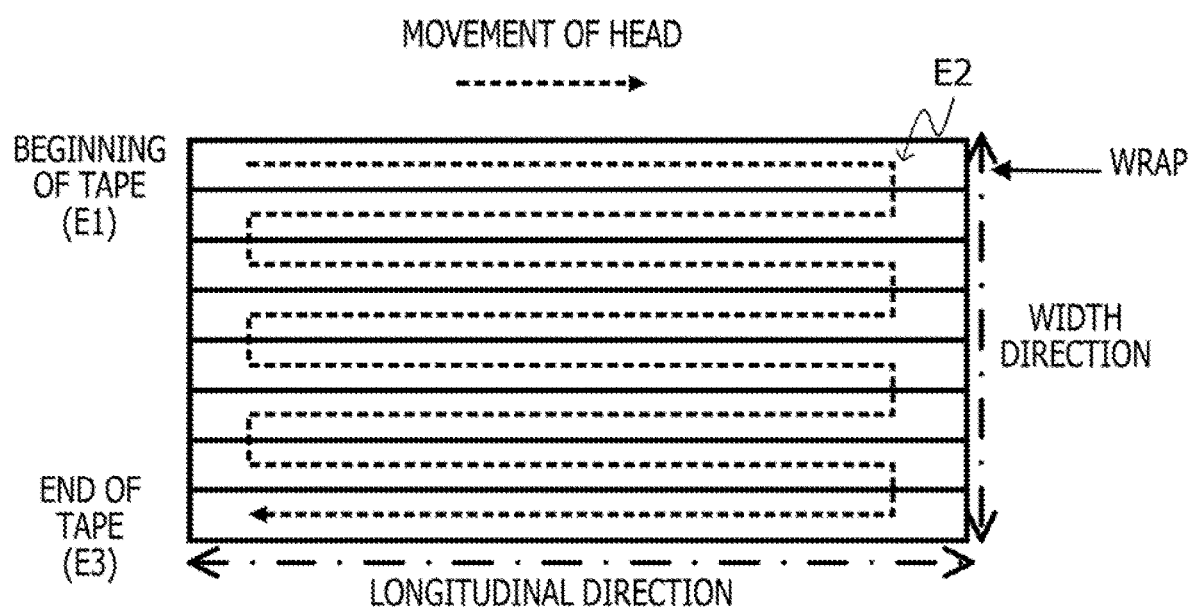
FIG. 7 is a diagram schematically illustrating a recording order of data on a tape medium illustrated in FIG. 4.

FIG. 7 is a diagram schematically illustrating a recording order of data on the tape medium 31 illustrated in FIG. 4.

The tape medium 31 has a physical structure called a wrap. When the tape medium 31 is read out from the beginning (refer to reference sign E1) to the end (refer to reference sign E3), the following processes indicated by (1-1) to (1-3) are performed.

(1-1) The initial wrap is read out in a longitudinal direction of the tape medium 31 from the beginning (refer to reference sign E1) to the end (refer to reference sign E2).

(1-2) A head is moved in a width direction of the tape medium 31, and the subsequent wrap is read out while the tape medium 31 is rotated in a reverse direction.

(1-3) While the processes in (1-1) and (1-2) above are repeated, the data is read out up to the end of the last wrap (refer to reference sign E3).

Figure 8:
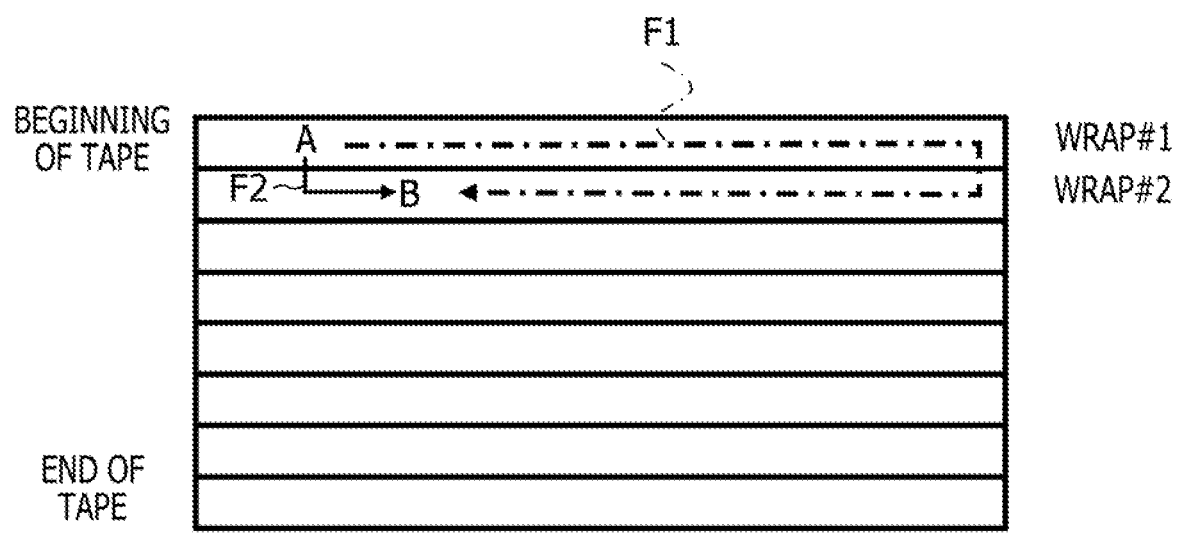
FIG. 8 is a diagram schematically illustrating a moving direction of a head on the tape medium illustrated in FIG. 4.

FIG. 8 is a diagram schematically illustrating a moving direction of the head on the tape medium 31 illustrated in FIG. 4.

In the example illustrated in FIG. 8, when moving from a point A in a wrap #1 to a point B in a wrap #2, the head does not need to move to the end of the wrap #1 as indicated by reference sign F1, but the head can move the shortest distance between the two points as indicated by reference sign F2.

In the exemplary embodiment, writing onto the tape medium 31 is implemented by the processes indicated by following (2-1) to (2-5) using the characteristics illustrated in FIG. 8.

(2-1) The stream data is written into the primary buffer unit 141 that has a capacity equal to one wrap, and when the capacity of the primary buffer unit 141 becomes full, the stream data is sorted in the column order and the time order, and written into the secondary buffer unit 142.

(2-2) The sorted data is written from the secondary buffer unit 142 onto the tape medium 31. At this time, the write start position on the tape medium 31 is adjusted so as to coincide with the beginning position of the wrap.

(2-3) Writing to the emptied primary buffer unit 141 is restarted, and when the capacity of the primary buffer unit 141 becomes full, the stream data is sorted in the column order and the time order, and written into the secondary buffer unit 142. The sort order of columns is the reverse of the sort order in (2-1) above. For example, when the previous sort is in ascending order, the current sort is performed in descending order. Note that the sort order of the times may be ascending order every time.

(2-4) The sorted data is written from the secondary buffer unit 142 onto the tape medium 31. At this time, the write start position on the tape medium 31 coincides with the beginning of a wrap subsequent to the previously written wrap.

(2-5) The processes in (2-1) to (2-4) above are repeated until the capacity of the tape medium 31 becomes full.

Figure 10:
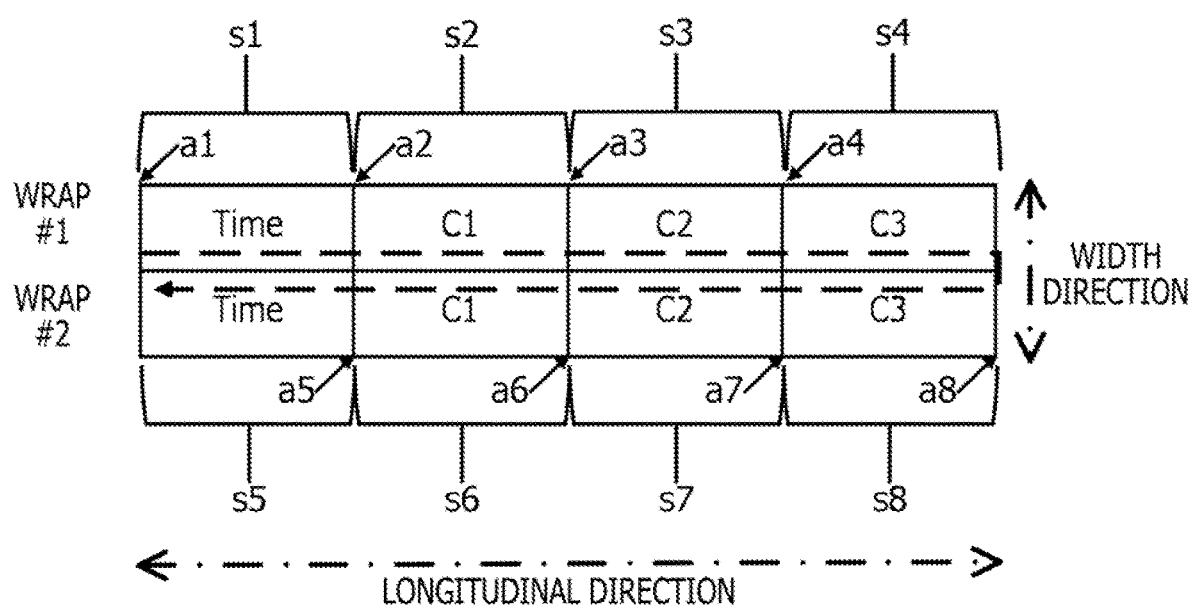
FIG. 10 is a diagram schematically illustrating a recording order of entries on the tape medium illustrated in FIG. 4.

FIG. 9 is a diagram exemplifying data position information in the information processing system 100 illustrated in FIG. 4. FIG. 10 is a diagram schematically illustrating a recording order of entries on the tape medium 31 illustrated in FIG. 4.

At the same time as the data is written onto the tape medium 31, the data position information illustrated in FIG. 9 is updated. The data position information records the position on the tape medium 31 where the data is stored. The data position information may be stored in the storage device 14 illustrated in FIG. 5.

In the example illustrated in FIG. 9, the number of columns is four: Time, C1, C2, and C3.

"Start time" and "end time" represent the time stamp of an initial entry and the time stamp of a last entry of the stream data stored in a certain wrap, respectively.

"Beginning address" of each column indicates the beginning address of an area in which the data of the column is stored, and may be represented by a logical address. Here, the logical address is an address logically representing one point between the beginning of the tape (which may be rephrased as "the beginning of the initial wrap") and the end of the tape (which may be rephrased as "the end of the last wrap").

"Size" of each column is the total size of the data of the column generated from "start time" to "end time".

Therefore, when the data position information illustrated in FIG. 9 is held, the data is recorded in the tape medium 31 in the order illustrated in FIG. 10.

The dashed arrow illustrated in FIG. 10 indicates a direction in which the logical address increases (which may be rephrased as "data writing direction").

Data generated from a time t1 to a time t2 is converted and stored in a wrap #1. Furthermore, data generated from a time t2 to a time t3 is converted and stored in a wrap #2.

Note that data stored in each wrap is not the data obtained at the same time interval, but the data obtained at the timing when the capacities of the primary buffer unit 141 and the secondary buffer unit 142 become full.

For example, data acquired during the 30 minutes from 20:00 to 20:30 may be stored in the wrap #1, and data acquired during the 45 minutes from 20:30 to 21:15 may be stored in the wrap #2. For example, in this case, the data size per unit time in the wrap #1 is larger than the data size per unit time in the wrap #2.

In this manner, since the data capacity stored in each wrap is made the same, the time for data stored in each wrap is different in some cases. Thus, as illustrated in FIG. 9, by recording "start time" and "end time" of the data stored in each wrap, it may be identified at the time of read-out access which wrap stores the data in which time section.

However, the size ratio between the respective columns is fixed regardless of the time section and the length of time for recording in the wrap. Since the size ratio between the respective columns is fixed, the same column is placed at the same position across the wraps in the width direction of the tape medium 31, as illustrated in FIG. 10.

Figure 12:
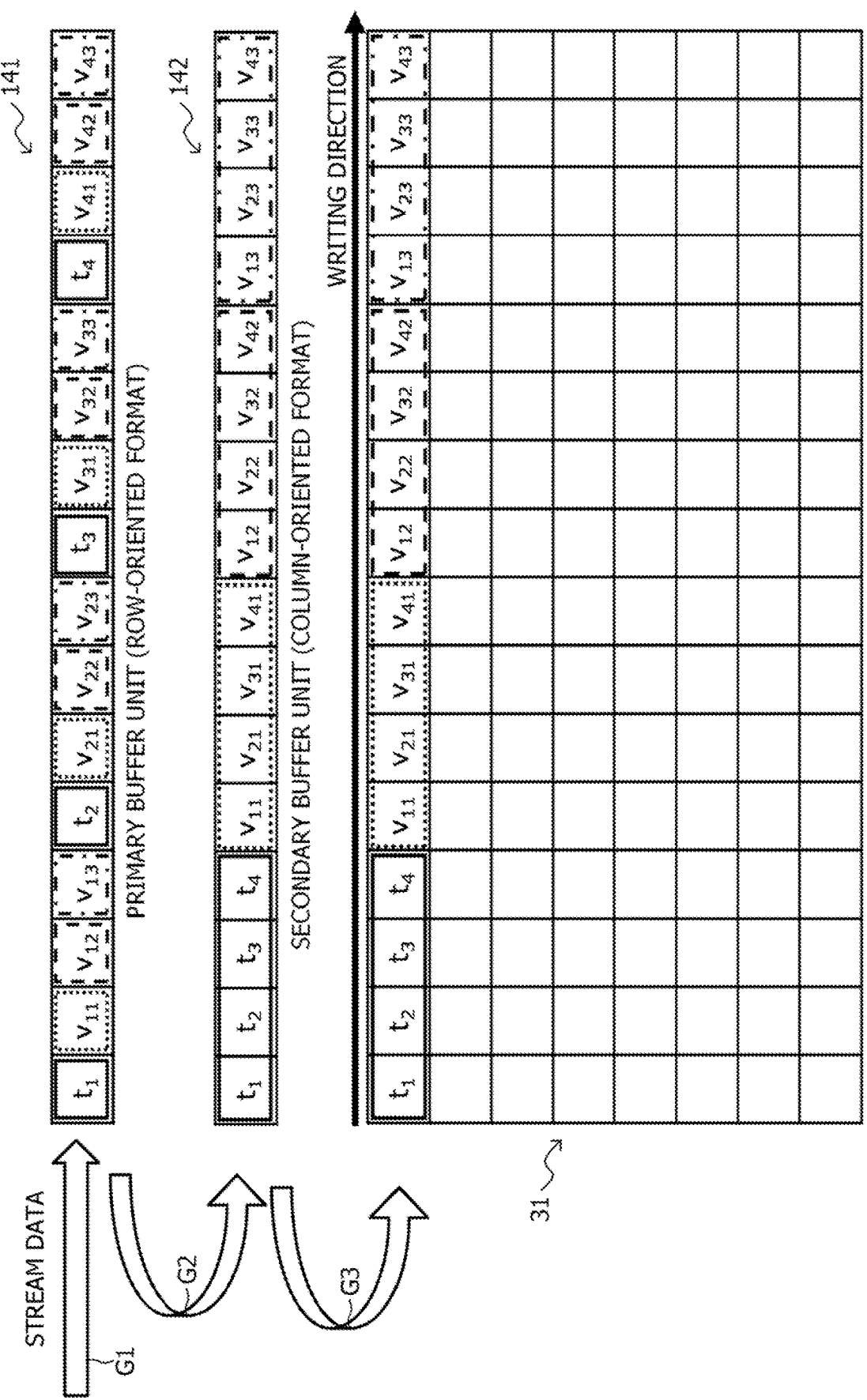
FIG. 12 is a table exemplifying a writing process for a first wrap in the information processing system illustrated in FIG. 4.
Figure 13:
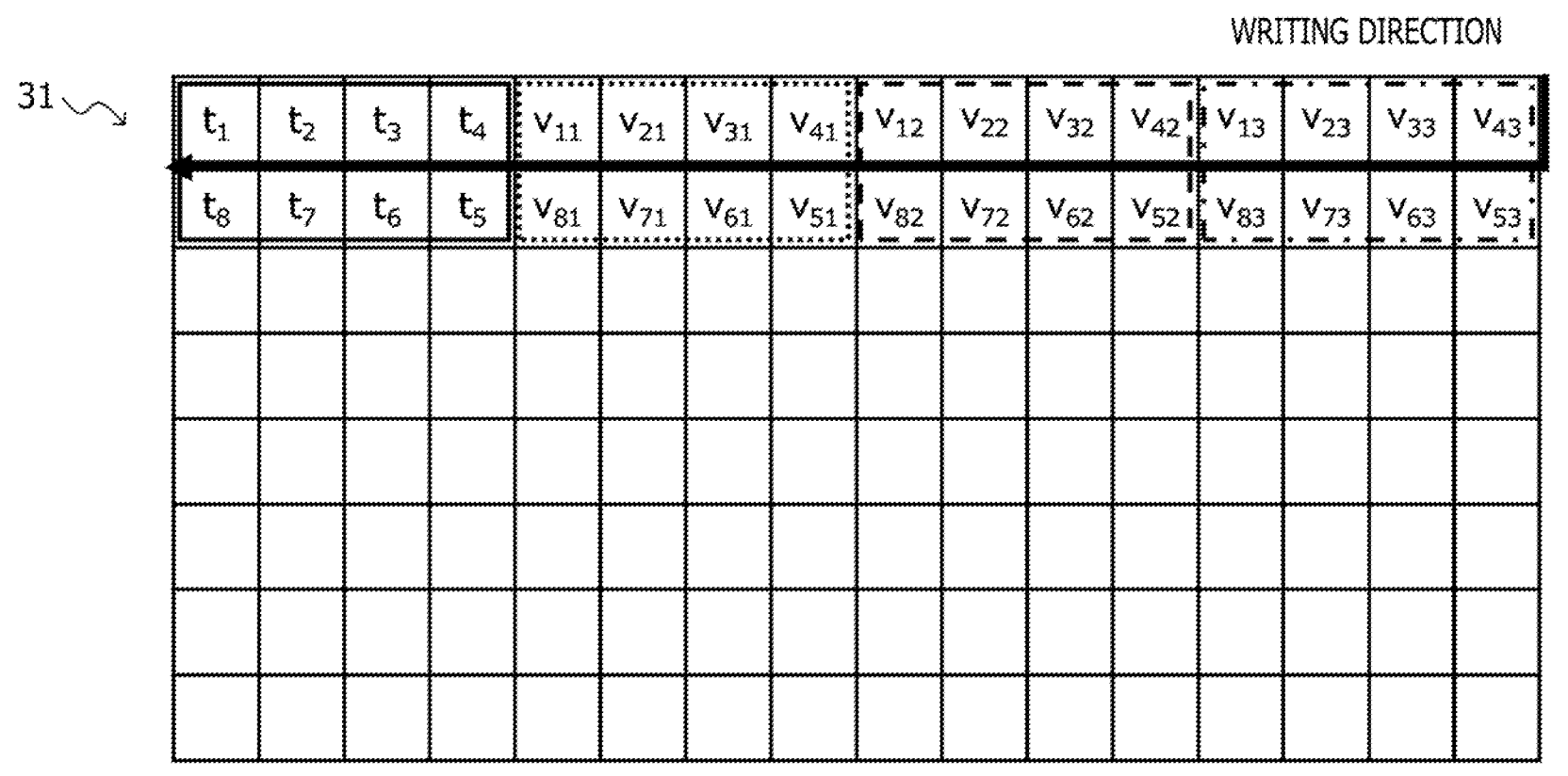

FIG. 11 is a table exemplifying stream data processed in the information processing system 100 illustrated in FIG. 4. FIG. 12 is a table exemplifying a writing process for a first wrap in the information processing system 100 illustrated in FIG. 4. FIG. 13 is a table exemplifying a writing process for a second wrap in the information processing system 100 illustrated in FIG. 4. FIG. 14 is a table exemplifying a writing process for all wraps in the information processing system 100 illustrated in FIG. 4.

First, stream data including four columns, namely, Time, C1, C2, and C3 as illustrated in FIG. 11 is assumed. Note that it is supposed that one wrap of the tape medium 31 can store data for four lines (which means 16 entries).

As indicated by reference sign G1 in FIG. 12, the stream data is stored in the primary buffer unit 141 in a row-oriented format. When the capacity of the primary buffer unit 141 becomes full, the row-oriented format is converted to the column-oriented format, and the converted stream data is stored in the secondary buffer unit 142, as indicated by reference sign G2. Then, as indicated by reference sign G3, the column-oriented format data in the secondary buffer unit 142 is written into the first wrap of the tape medium 31. In the first wrap, the head is moved from the left direction to the right direction in FIG. 12, and the data is written in the order of t1, t2, t3, t4, V11, V21, V31, V41, V12, V22, V32, V42, V13, V23, V33, and V43.

As illustrated in FIG. 13, in the second wrap, the head is moved in a direction reverse to the direction in the first wrap; additionally, the columns are sorted in the order reverse to the order in the first wrap, and the data in the columns is sorted in the time order and written. As a consequence, in the second wrap, the head is moved from the right direction to the left direction in FIG. 13, and the data is written in the order of V53, V63, V73, V83, V52, V62, V72, V82, V51, V61, V71, V81, t5, t6, t7, and t8.

Then, the writing actions illustrated in FIGS. 12 and 13 are repeated until the capacity of the tape medium 31 becomes full, and the data layout on the tape medium 31 is given as illustrated in FIG. 14. The head is moved in opposite directions and the columns are written in opposite orders between the odd numbered wraps and the even numbered wraps.

Figure 15:
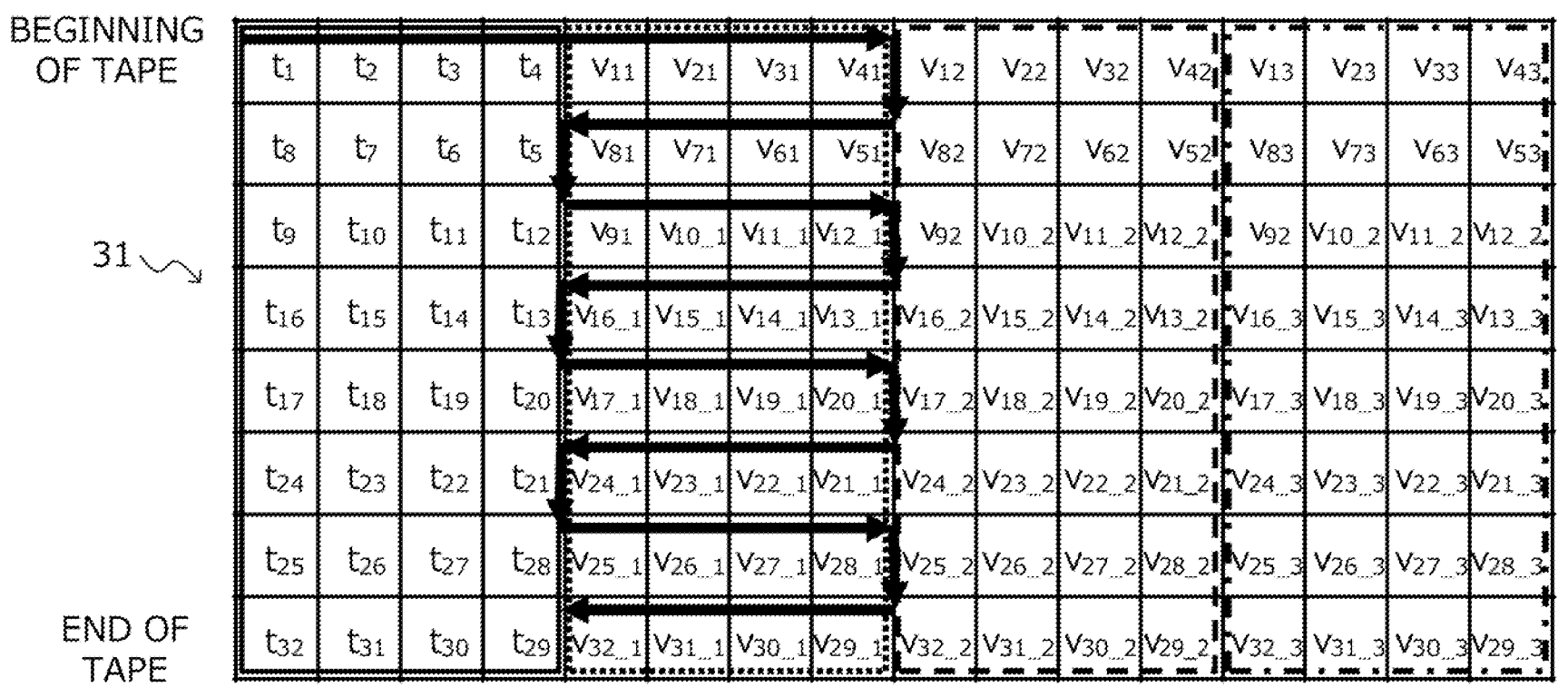

FIG. 15 is a table exemplifying a writing process for some columns in the information processing system 100 illustrated in FIG. 4.

When all pieces of data V11 to V32_1 in the column cl illustrated in FIG. 11 are read out from the tape medium 31 assuming that the head is located at the beginning of the tape medium 31, the movement of the head is as illustrated in FIG. 15.

Consequently, the amount of movement of the head when the same column is read out may be minimized such that reading-out is speeded up, and besides the capacity of the high-speed storage to be used for buffering may be suppressed to a capacity for two wraps.

[A-2] Exemplary Actions

Figure 16:
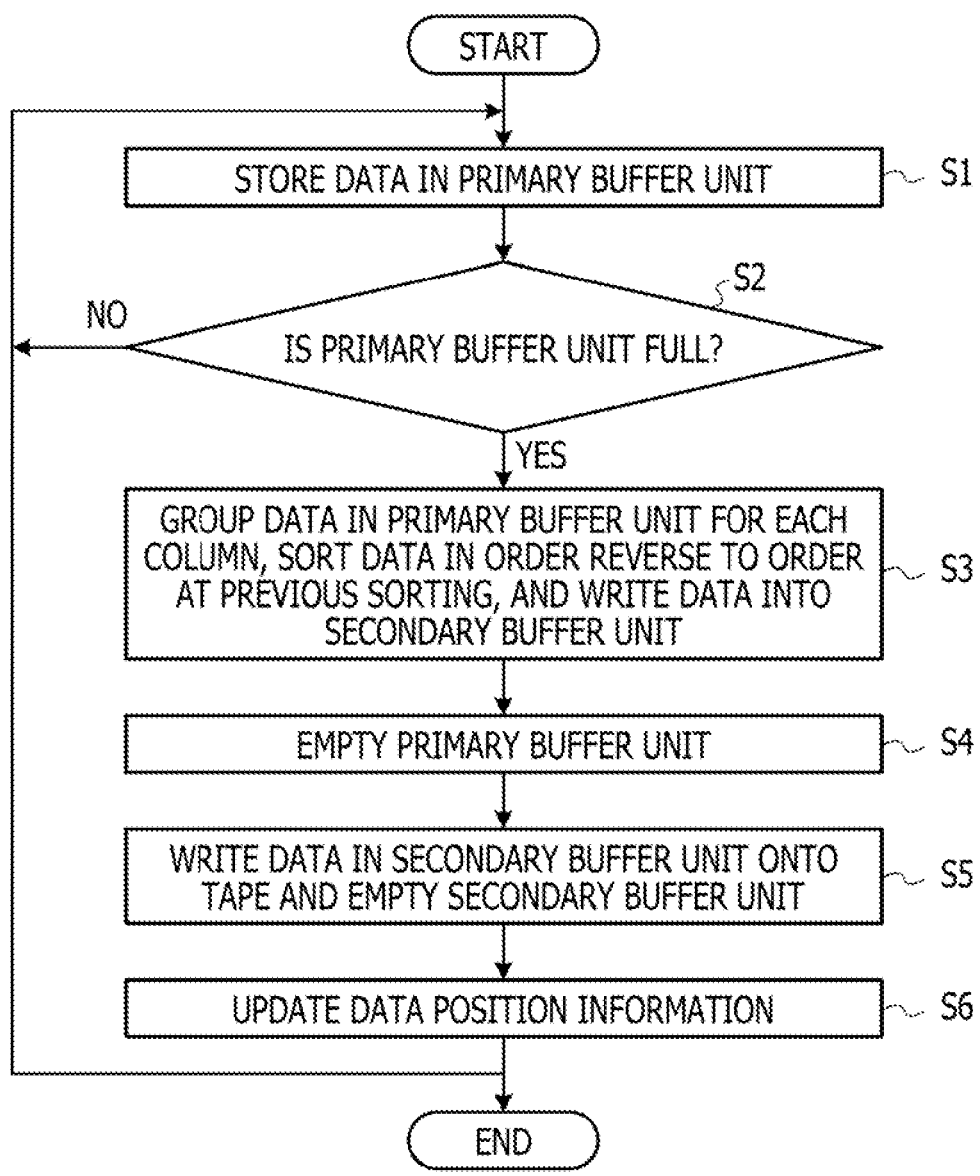
FIG. 16 is a flowchart explaining a stream data writing process in the information processing system illustrated in FIG. 4.

The stream data writing process in the information processing system 100 illustrated in FIG. 4 will be described with reference to the flowchart (steps S1 to S6) illustrated in FIG. 16.

The sort processor 111 stores stream data in the primary buffer unit 141 (step S1).

The sort processor 111 determines whether the capacity of the primary buffer unit 141 is full (step S2).

When the capacity of the primary buffer unit 141 is not full (refer to NO route in step S2), the process returns to step S1.

On the other hand, when the capacity of the primary buffer unit 141 is full (refer to YES route in step S2), the process proceeds to step S3. Accordingly, the sort processor 111 groups the data in the primary buffer unit 141 for each column, sorts the data in an order reverse to the order at the previous sorting, and writes the data into the secondary buffer unit 142 (step S3).

The sort processor 111 empties the primary buffer unit 141 (step S4).

The write controller 112 writes the data in the secondary buffer unit 142 onto the tape medium 31 and empties the secondary buffer unit 142 (step S5).

The write controller 112 updates the data position information based on the result of writing onto the tape medium 31 (step S6). Then, the writing process for the stream data ends.

Figure 17:
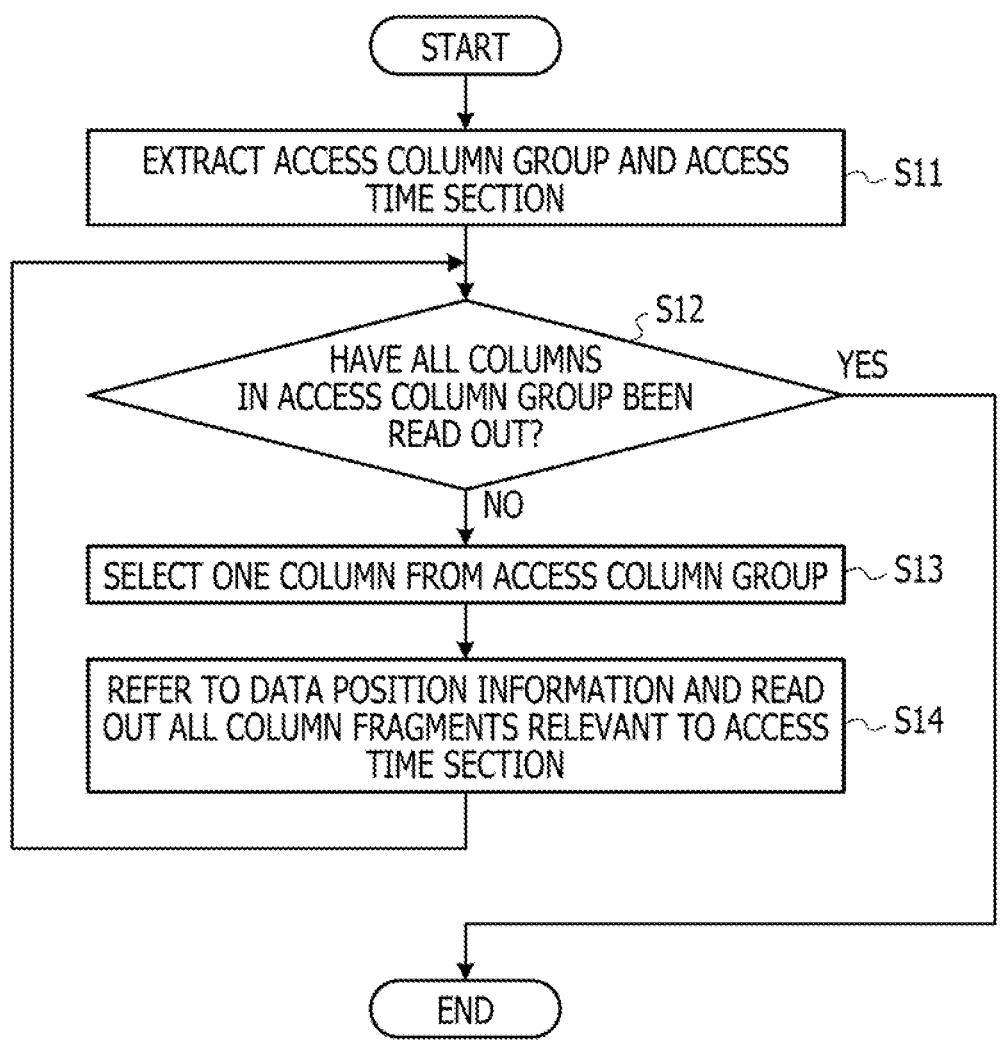
FIG. 17 is a flowchart explaining a stream data reading process in the information processing system illustrated in FIG. 4.

Next, the stream data reading process in the Information processing system 100 illustrated in FIG. 4 will be described with reference to the flowchart (steps S11 to S14) illustrated in FIG. 17.

Upon reception of a read-out request, the read-out controller 113 extracts a column group accessed by the read-out request (which may be referred to as "access column group") and a time section for the access (which may be referred to as "access time section") (step S1).

The read-out controller 113 determines whether all columns in the access column group have been read out (step S12).

When all the columns in the access column group have been read out (refer to YES route in step S12), the stream data reading process ends.

On the other hand, when there is a column that has not been read out in the access column group (refer to NO route in step S12), the read-out controller 113 selects one column from the access column group (step S13).

The read-out controller 113 refers to the data position information and reads out all column fragments relevant to the time section for the access (step S14). Then, the process returns to step S12.

[A-3] Effects

The sort processor 111 sorts stream data buffered in units of wraps of the tape medium 31, in the column order and the time order of the stream data, as the primary data to be written onto the tape medium 31 in the primary wrap. The write controller 112 controls writing of the primary data sorted by the sort processor 111 into the primary wrap. The sort processor 111 sorts the secondary data to be written into the secondary wrap that follows the primary wrap, in a reverse order of the column order and in the time order. The write controller 112 controls writing of the secondary data sorted by the sort processor 111 into the secondary wrap.

With this procedure, the read-out time of data having a time series may be shortened when only some columns on a sequential recording medium is read out.

The write controller 112 controls writing of the primary data and the secondary data such that an entry to be written last into the primary wrap and an entry to be written initially into the secondary wrap belong to the same column in the stream data and its times are continuous.

This may minimize the amount of movement of the head when reading out data in a single column.

[B] Others

The disclosed technique is not limited to the embodiment described above, and various modifications may be made without departing from the spirit of the present embodiment.

Each of the configurations and processes according to the present embodiment may be selected as needed, or may be combined as appropriate.

While the information processing system 100 includes the tape medium 31 as a recording medium that stores the stream data in the exemplary embodiment described above, it is not limited thereto. The information processing system 100 may include various sequential recording media. Examples of the various sequential recording media include optical discs such as a compact disc (CD), a digital versatile disc (DVD), and a Blu-ray disc, for example. A CD may include a CD-ROM, CD recordable (CD-R), CD rewritable (CD-RW), and the like, and a DVD may include a DVD-ROM, DVD-RAM, DVD-R, DVD+R, DVD-RW, DVD+RW, HD DVD, and the like.

As described above, the stream data is stored in the respective sequential recording media, whereby the effect of the exemplary embodiment described above may be particularly expected.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory, the processor being configured to perform processing including:
storing, in a first buffer that has a data size corresponding to a unit of a wrap in a sequential recording medium, first row-oriented data sets among a plurality of row-oriented data sets, each row-oriented data set of the plurality of row-oriented data sets including: time information indicating a corresponding time point, and a plurality of pieces of stream data corresponding to the time information, each piece of stream data of the plurality of pieces of stream data being a piece of stream data associated with a different column of a plurality of columns;
converting the first row-oriented data sets stored in the first buffer to first column-oriented data sets, to store the converted first column-oriented data sets in a second buffer, the first column-oriented data sets including: a first time information set, and a first plurality of stream data sets, the first time information set including at least first start time information and first end time information, the first start time information corresponding to, among a plurality of pieces of time information included in the first row-oriented data sets, time information that indicates an earliest time, the first end time information corresponding to, among the plurality of pieces of time information included in the first row-oriented data sets, time information that indicates a latest time, the first plurality of stream data sets including at least a first stream data set and a second stream data set, the first stream data set including in a time order a plurality of pieces of stream data associated with a first column among the plurality of columns included in the first row-oriented data sets, the second stream data set including in the time order a plurality of pieces of stream data associated with a second column among the plurality of columns included in the first row-oriented data sets;

writing the first column-oriented data sets into a first wrap of the sequential recording medium through a head, the writing of the first column-oriented data sets including writing, in a first direction of the sequential recording medium, the first column-oriented data sets in an order of at least the time information set, the first stream data set, and the second stream data set;

moving, in a case where the head reaches an end point of the first wrap, the head from the first wrap to a second wrap adjacent to the first wrap;

storing, in the first buffer, second row-oriented data sets among the plurality of row-oriented data sets;

converting the second row-oriented data sets stored in the first buffer to second column-oriented data sets, to store the converted second column-oriented data sets in the second buffer, the second column-oriented data sets including: a second time information set, and a second plurality of stream data sets, the second time information set including at least second start time information and second end time information, the second start time information corresponding to, among a plurality of pieces of time information included in the second row-oriented data sets, time information that indicates an earliest time, the second end time information corresponding to, among the plurality of pieces of time information included in the second row-oriented data sets, time information that indicates a latest time, the second plurality of stream data sets including at least a third stream data set and a fourth stream data set, the third stream data set including in the time order a plurality of pieces of stream data associated with the first column included in the second row-oriented data sets, the fourth stream data set including in the time order a plurality of pieces of stream data associated with the second column included in the second row-oriented data sets; and writing the second column-oriented data sets into the second wrap of the sequential recording medium through the head, the writing of the second column-oriented data sets including writing, in a second direction of the sequential recording medium, the second column-oriented data sets in an order of at least the fourth stream data set, the third stream data set, and the second time information set, the second direction being a reverse direction relative to the first direction, the second time information set written in the second wrap is located adjacent to the first time information set written in the first wrap in a vertical direction relative to the first and second directions.

2. An information processing system comprising:

an information processing device; and a recording device configured to write data onto a sequential recording medium under control of the information processing device, wherein the information processing device includes:

a memory; and a processor coupled to the memory, the processor being configured to perform processing including:

storing, in a first buffer that has a data size corresponding to a unit of a wrap in the sequential recording medium, first row-oriented data sets among a plurality of row-oriented data sets, each row-oriented data set of the plurality of row-oriented data sets including: time information indicating a corresponding time point, and a plurality of pieces of stream data corresponding to the time information, each piece of stream data of the plurality of pieces of stream data being a piece of stream data associated with a different column of a plurality of columns;

converting the first row-oriented data sets stored in the first buffer to first column-oriented data sets, to store the converted first column-oriented data sets in a second buffer, the first column-oriented data sets including: a first time information set, and a first plurality of stream data sets, the first time information set including at least first start time information and first end time information, the first start time information corresponding to, among a plurality of pieces of time information included in the first row-oriented data sets, time information that indicates an earliest time, the first end time information corresponding to, among the plurality of pieces of time information included in the first row-oriented data sets, time information that indicates a latest time, the first plurality of stream data sets including at least a first stream data set and a second stream data set, the first stream data set including in a time order a plurality of pieces of stream data associated with a first column among the plurality of columns included in the first row-oriented data sets, the second stream data set including in the time order a plurality of pieces of stream data associated with a second column among the plurality of columns included in the first row-oriented data sets;

writing the first column-oriented data sets into a first wrap of the sequential recording medium through a head, the writing of the first column-oriented data sets including writing, in a first direction of the sequential recording medium, the first column-oriented data sets in an order of at least the time information set, the first stream data set, and the second stream data set;

moving, in a case where the head reaches an end point of the first wrap, the head from the first wrap to a second wrap adjacent to the first wrap;

storing, in the first buffer, second row-oriented data sets among the plurality of row-oriented data sets;

converting the second row-oriented data sets stored in the first buffer to second column-oriented data sets, to store the converted second column-oriented data sets in the second buffer, the second column-oriented data sets including: a second time information set, and a second plurality of stream data sets, the second time information set including at least second start time information and second end time information, the second start time information corresponding to, among a plurality of pieces of time information included in the second row-oriented data sets, time information that indicates an earliest time, the second end time information corresponding to, among the plurality of pieces of time information included in the second row-oriented data sets, time information that indicates a latest time, the second plurality of stream data sets including at least a third stream data set and a fourth stream data set, the third stream data set including in the time order a plurality of pieces of stream data associated with the first column included in the second row-oriented data sets, the fourth stream data set including in the time order a plurality of pieces of stream data associated with the second column included in the second row-oriented data sets; and writing the second column-oriented data sets into the second wrap of the sequential recording medium through the head, the writing of the second column-oriented data sets including writing, in a second direction of the sequential recording medium, the second column-oriented data sets in an order of at least the fourth stream data set, the third stream data set, and the second time information set, the second direction being a reverse direction relative to the first direction, the second time information set written in the second wrap is located adjacent to the first time information set written in the first wrap in a vertical direction relative to the first and second directions.

3. A non-transitory computer-readable storage medium for storing a program which causes a processor to perform processing, the processing comprising:

storing, in a first buffer that has a data size corresponding to a unit of a wrap in a sequential recording medium, first row-oriented data sets among a plurality of row-oriented data sets, each row-oriented data set of the plurality of row-oriented data sets including: time information indicating a corresponding time point, and a plurality of pieces of stream data corresponding to the time information, each piece of stream data of the plurality of pieces of stream data being a piece of stream data associated with a different column of a plurality of columns;

converting the first row-oriented data sets stored in the first buffer to first column-oriented data sets, to store the converted first column-oriented data sets in a second buffer, the first column-oriented data sets including: a first time information set, and a first plurality of stream data sets, the first time information set including at least first start time information and first end time information, the first start time information corresponding to, among a plurality of pieces of time information included in the first row-oriented data sets, time information that indicates an earliest time, the first end time information corresponding to, among the plurality of pieces of time information included in the first row-oriented data sets, time information that indicates a latest time, the first plurality of stream data sets including at least a first stream data set and a second stream data set, the first stream data set including in a time order a plurality of pieces of stream data associated with a first column among the plurality of columns included in the first row-oriented data sets, the second stream data set including in the time order a plurality of pieces of stream data associated with a second column among the plurality of columns included in the first row-oriented data sets;

writing the first column-oriented data sets into a first wrap of the sequential recording medium through a head, the writing of the first column-oriented data sets including writing, in a first direction of the sequential recording medium, the first column-oriented data sets in an order of at least the time information set, the first stream data set, and the second stream data set;

moving, in a case where the head reaches an end point of the first wrap, the head from the first wrap to a second wrap adjacent to the first wrap;

storing, in the first buffer, second row-oriented data sets among the plurality of row-oriented data sets;

converting the second row-oriented data sets stored in the first buffer to second column-oriented data sets, to store the converted second column-oriented data sets in the second buffer, the second column-oriented data sets including: a second time information set, and a second plurality of stream data sets, the second time information set including at least second start time information and second end time information, the second start time information corresponding to, among a plurality of pieces of time information included in the second row-oriented data sets, time information that indicates an earliest time, the second end time information corresponding to, among the plurality of pieces of time information included in the second row-oriented data sets, time information that indicates a latest time, the second plurality of stream data sets including at least a third stream data set and a fourth stream data set, the third stream data set including in the time order a plurality of pieces of stream data associated with the first column included in the second row-oriented data sets, the fourth stream data set including in the time order a plurality of pieces of stream data associated with the second column included in the second row-oriented data sets; and writing the second column-oriented data sets into the second wrap of the sequential recording medium through the head, the writing of the second column-oriented data sets including writing, in a second direction of the sequential recording medium, the second column-oriented data sets in an order of at least the fourth stream data set, the third stream data set, and the second time information set, the second direction being a reverse direction relative to the first direction, the second time information set written in the second wrap is located adjacent to the first time information set written in the first wrap in a vertical direction relative to the first and second directions.

* * * * *